No. 886,880. PATENTED MAY 5, 1908.
J. SHEPHERD.
TROLLEY.
APPLICATION FILED DEC. 30, 1907.
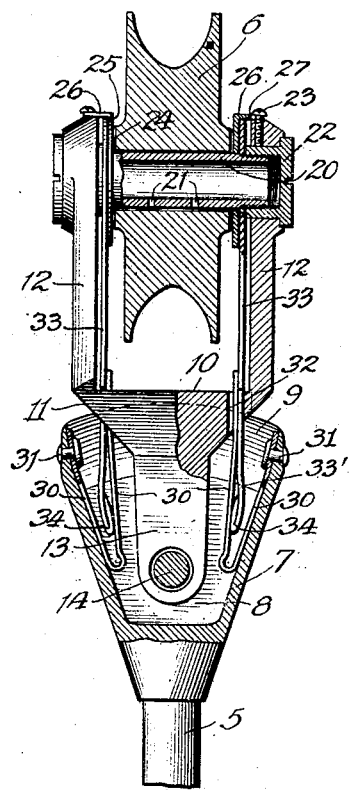
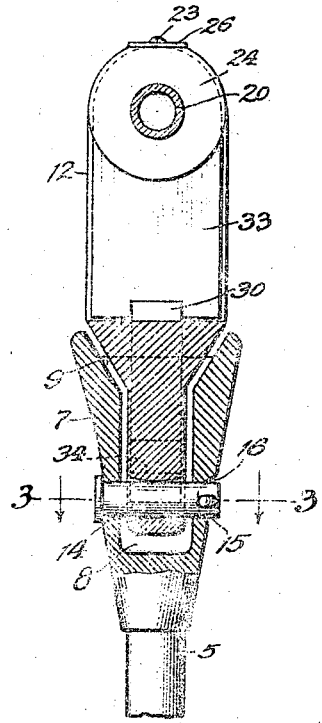
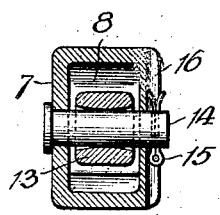
Witnesses
Harry R. White
Ray White
Inventor
John Shepherd
By Foree Bain and May
Attys

UNITED STATES PATENT OFFICE.

JOHN SHEPHERD, OF CHICAGO, ILLINOIS.

TROLLEY.

No. 886,880.  Specification of Letters Patent.  Patented May 5, 1908.

Application filed December 20, 1907. Serial No. 407,380.

*To all whom it may concern:*

Be it known that I, JOHN SHEPHERD, a citizen of the United States, residing at Chicago, in the county of Cook and State of Illinois, have invented certain new and useful Improvements in Trolleys, of which the following is a specification.

My invention relates to improvements in trolleys, and has for its general object to provide means for connecting a trolley wheel with a supporting pole, constructed to enable the wheel to accurately and constantly follow the trolley wire and make effective contact therewith, to minimize arcing between the wire and wheel, and to prevent the wheel from jumping from the trolley wire in passage around curves or over inequalities in the wire.

In pursuance of this general object, further objects of my invention are to provide an efficient anti-friction bearing for the trolley wheel, whereby the center of rotation may be evenly maintained, and a mounting for the trolley harp which will permit the axle to partake of such movements as are necessary to insure maintenance of the wheel in properly contacting relation with the wire at all times.

Another object of my invention is to provide a simple and efficient contact spring arrangement for carrying current from the trolley wheel to the pole; and yet another object of my invention is to provide such arrangement in form and construction which tends to steady the trolley harp and yieldingly position it normally in alinement with the trolley pole, without interfering with its freedom for necessary movements as described.

In the drawing, forming a part hereof, I have illustrated an operative embodiment of my invention in a form which I have found practical and advantageous for purposes of a full disclosure of the invention, and in such drawing; Figure 1 is a front view, partly in section and partly in elevation, of a connection between a trolley wheel and pole embodying my invention. Fig. 2 is a central vertical section of the same. Fig. 3 is a horizontal section on line 3—3 of Fig. 2.

Throughout the drawing like numerals of reference refer always to like parts.

In the drawing 5 indicates in general a trolley pole, and 6 a trolley wheel.

In the preferred embodiment of my invention the trolley wheel is mounted in a harp which pivots in a socket formed in a head member mounted upon the pole, although for some of the purposes of my invention this arrangement may be reversed. In the specific construction shown the trolley pole 5 is provided at its upper end with a head member 7, preferably flaring laterally from bottom to top and flaring to preferably a less extent from front to back, as shown in Fig. 2.

In the head member is formed a recess or socket 8, the front and rear surfaces of which are preferably parallel throughout the lower portion of their extent, and preferably diverging upwardly adjacent their upper extremities to form a flaring portion 9 of the socket, as best shown in Fig. 2. The side surfaces of the socket preferably diverge upwardly throughout their entire extent, as illustrated in Fig. 1. In the socket 8 thus provided is pivotally mounted a harp, generally indicated at 10. Said harp in the preferred embodiment shown comprises an invertedly pyramidal body part 11 from which extends upwardly fork arms 12—12, and from the small base whereof depends a stem 13, the arrangement being such that the front and rear faces of the body 11 substantially conform to the shape of the flaring portion 9 of the recess 8, while the width or lateral extent of the body part 11 is substantially less than the width of the mouth or upper portion of the recess 8, to permit of lateral play of the harp 10.

The faces or front and rear walls of the head 7 and the stem 13 are provided with registering apertures through which extend a headed pivot pin 14, preferably retained in place by a cotter pin 15 passing transversely therethrough and lying in a recess 16 formed transversely of one face of the socket or head 7.

I have found it to be highly advantageous to leave the wheel free for slight fore-and-aft movements and slight twisting movement with respect to the bolt in addition to the relatively greater transverse pivotal or swinging movement permitted by the laterally flaring shape of the socket in head 7. For this reason I prefer that the fit of the stem 13 upon the pivot pin 14 shall be sufficiently loose, and that the fore-and-aft fit of the body 11 and stem 13 in their respective portions of the socket shall likewise be sufficiently loose to enable the harp to be twisted about its longitudinal axis to the extent of a few degrees, and so that it may likewise play fore-and-aft in the socket to the extent of a slight movement. For the purpose described the aperture in the stem is preferably tapering from both sides toward the center.

The arrangement hereinbefore described permits the harp to move to such extent and in such direction as I have found practically necessary to insure maintenance of the wheel in contact with the trolley wire over uneven and curved sections of the wire, and I have found by practical experience with the device above described, upon ordinary, operating trolley lines, that such provision for the maintenance of effective contact lengthens the life of the ordinary trolley wheel to several times the extent of its life when the harp is rigidly connected in customary manner with the pole. Furthermore I have found that by the arrangement described jumping of the trolley wheel from the track is practically eliminated and becomes of rare occurrence.

To further insure length of life of the trolley wheel by maintenance of the uniform condition as to the presentation of the trolley wheel to the wire, I provide an arrangement whereby wear of the trolley wheel on its axis of rotation is substantially obviated, so that the wheel may not wabble on the axle, and I further provide simple and efficient means for carrying the current from the trolley wheel to the trolley pole which avoids undue heating and arcing between the relatively moving parts. To these ends I provide as a bearing axle for the wheel, a hollow shaft 20, provided at intervals with perforations 21, and said hollow shaft I preferably maintain practically full of hard oil or other lubricating substances, which will slowly be applied through the openings 21 to lubricate the bearings of the wheel.

The outer ends of the hollow shaft, 20, are preferably threaded and have screwed thereon solid heads 22 which bear in and preferably extend upward beyond the fork arms 12—12 and are secured against rotation by set screws 23, cotter pins or the like the heads whereof project above the ends of the fork-arms 12—12.

The side faces of the wheel 6 are dressed as at 24, adjacent the axis of rotation, and for bearing against such dressed surfaces I provide metal contact washers 25, each having a lip 26 bent outwardly over the end of the fork arm 12 and having therein a recess 27 partially embracing the head of set screw 23, or the like, to hold the washer against rotation.

The conducting strip and spring arrangement I prefer shall be as follows; 30 indicates a bent spring strip, preferably of phosphor bronze, brass or the like, of narrow V-shape, having its shorter length secured as by a rivet 31 to an inner side base of the socket 8, and extending downward, substantially in contact with said socket to the bottom angle, and thence upward through an opening 32 in the body 11 of the harp member to a point slightly above the said body. Its upwardly extending limb is under tension acting outwardly on the harp. A second spring member, 33 is provided having a relatively wide upper portion provided with an aperture through which the hollow axle 20 passes, and arranged between the washer 25 and the end of cap 22, such spring member 33 being narrowed at its lower end 33' into a tongue which passes down through the aperture 32 aforesaid, between the arms of the V-shaped spring 30, and at its lower extremity is doubled back upon itself as at 34 and given an inward bend to insure contact of such lower point with the inner arm of the spring 30. The end 33' of the spring is under tension acting inwardly.

The arrangement described insures effective contact between the wheel, the washer 25 and the spring 33; and sliding self-cleaning contacts between the two springs 33 and 30, the latter being permanently and rigidly connected to the head or socket member attached to the pole, and bearing thereagainst throughout a considerable length. It will be observed further that the springs arranged as shown tend somewhat to hold the harp in vertical position, but yield to permit movement of the harp laterally, twistingly, or fore-and-aft, as the spring connection is not rigid in any direction.

While I have herein described in some detail an operative embodiment of my invention, it will be apparent to those skilled in the art that changes in the specific details of construction might be made without departure from the teachings of my invention.

Having thus described my invention, what I claim and desire to secure by Letters Patent, is;

1. The combination with a trolley wheel and a trolley pole, of means for connecting the trolley wheel with the pole, comprising a self-lubricating axle, whereon the wheel is mounted, a harp carrying said axle, provided at its lower end with a stem, a head member mounted upon the trolley pole and provided with a socket into which the stem extends, a pivot pin extending from front to back through the head and stem, the stem being mounted in its pivot pin and in its socket to permit of twisting and fore-and-aft movement of the harp with respect to the socket to a relatively small degree, and transverse pivotal movement of the harp upon the pivot to a greater degree.

2. The combination with a trolley wheel and a trolley pole, of means for connecting the wheel and pole comprising a self-lubricating axle whereon the wheel is mounted, a harp carrying said axle, a stem and socket connection between the harp and pole, arranged to leave the harp free for very limited fore-and-aft and twisting movement and greater lateral pivotal movement, and spring conductors between the wheel and pole comprising two separable members, one carried by the pole and the other by the harp.

3. The combination with a trolley wheel and trolley pole, of means for connecting the wheel and pole comprising a head member mounted on the pole having a laterally flaring socket therein, a harp having a depending stem projecting into said socket, a pivot pin extending through the socket and stem, the stem being arranged upon said pin and within the socket for slight twisting and fore-and-aft movement, and for lateral pivotal movement to a greater extent.

4. The combination with a trolley wheel and a trolley pole, of means for connecting the wheel and pole comprising a harp carrying the wheel, a stem-and-socket connection between the harp and pole arranged to leave the harp free for slight fore-and-aft and twisting movements and greater lateral pivotal movement, and spring conductors between the wheel and pole, comprising two separable members one carried by the pole and the other by the harp, said two spring members being arranged for sliding contact with each other to maintain effective contact throughout the changes in relative position of the pole and harp.

5. The combination with a trolley wheel and a trolley pole of means for connecting the wheel and pole comprising a head mounted on the trolley pole and having a socket therein, a trolley harp having a stem extending into said socket, a pin extending through the socket and stem whereon the harp is pivotally mounted, an axle whereon the trolley wheel is mounted, carried by the harp, non-rotatable contact washers on opposite sides of the trolley wheel, depending contact springs bearing against said washers and extending down through suitably provided apertures in the lower part of the harp, and coacting contact springs secured in the socket and extending up through the said aperture in the harp to constantly make sliding contact with the first said contact springs.

In testimony whereof I hereunto set my hand in the presence of two witnesses.

JOHN SHEPHERD.

In the presence of—
 FORÉE BAIN,
 MARY F. ALLEN.